(12) United States Patent
Yagi et al.

(10) Patent No.: US 9,445,030 B2
(45) Date of Patent: Sep. 13, 2016

(54) RADIATION IMAGE CAPTURING APPARATUS AND METHOD OF DRIVING THE SAME

(71) Applicant: CANON KABUSHIKI KAISHA, Tokyo (JP)

(72) Inventors: Tomoyuki Yagi, Honjo (JP); Toshio Kameshima, Kumagaya (JP); Katsuro Takenaka, Honjo (JP); Atsushi Iwashita, Saitama (JP); Eriko Sato, Tokyo (JP); Hideyuki Okada, Honjo (JP); Takuya Ryu, Kokubunji (JP); Kosuke Terui, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/801,549

(22) Filed: Jul. 16, 2015

(65) Prior Publication Data
US 2016/0021290 A1    Jan. 21, 2016

(30) Foreign Application Priority Data
Jul. 18, 2014   (JP) ................................. 2014-148161

(51) Int. Cl.
  *G01J 1/42*   (2006.01)
  *H04N 5/378*  (2011.01)
  *H04N 5/33*   (2006.01)

(52) U.S. Cl.
  CPC ................ *H04N 5/378* (2013.01); *H04N 5/33* (2013.01)

(58) Field of Classification Search
  CPC ................................. G01T 1/026; G01T 1/02
  See application file for complete search history.

(56) References Cited

U.S. PATENT DOCUMENTS

| | | | |
|---|---|---|---|
| 7,227,926 B2 | 6/2007 | Kameshima et al. | 378/98.9 |
| 7,403,594 B2 | 7/2008 | Endo et al. | 378/114 |
| 2008/0001094 A1* | 1/2008 | Korthout | G01T 1/026 250/370.07 |
| 2013/0223592 A1* | 8/2013 | Sato | A61B 6/4233 378/62 |
| 2014/0241501 A1 | 8/2014 | Sato et al. | 378/62 |

FOREIGN PATENT DOCUMENTS

JP   2013-135390 A   7/2013

* cited by examiner

*Primary Examiner* — Kiho Kim
(74) *Attorney, Agent, or Firm* — Fitzpatrick, Cella, Harper & Scinto

(57) ABSTRACT

A radiation image capturing apparatus, comprising a sensor configured to monitor an irradiating dose of radiation, a switch configured output a sensor signal from the sensor, a readout unit configured to read out the sensor signal via a signal line, and a controlling unit, wherein the controlling unit performs first control of repeatedly performing, while the sensor is irradiated, a series of operations including a first operation of setting the switch to a conductive state and a second operation of setting the switch to a non-conductive state, second control of reading out the sensor signal in the first operation as a first signal and a potential of the signal line in the second operation as a second signal, and third control of calculating the irradiating dose of radiation based on the first signal and the second signal.

20 Claims, 7 Drawing Sheets

FIG. 5A

| TUBE VOLTAGE [kVp] | TUBE CURRENT [mA] | PARAMETER T [μsec] |
|---|---|---|
| 70 | 50 | 500 |
| 70 | 50 | 510 |
| 70 | 200 | 800 |
| 110 | 50 | 1000 |
| 110 | 50 | 980 |
| 80 | 50 | 300 |
| 60 | 100 | 200 |

$T_{MAX} = 1000$

FIG. 5B

| TUBE VOLTAGE [kVp] | TUBE CURRENT [mA] | PARAMETER T [μsec] |
|---|---|---|
| 70 | 50 | 500 |
| 80 | 100 | 1000 |
| 70 | 200 | 800 |
| 110 | 50 | 1000 |
| 80 | 100 | 400 |
| 70 | 50 | 300 |
| 60 | 100 | 200 |

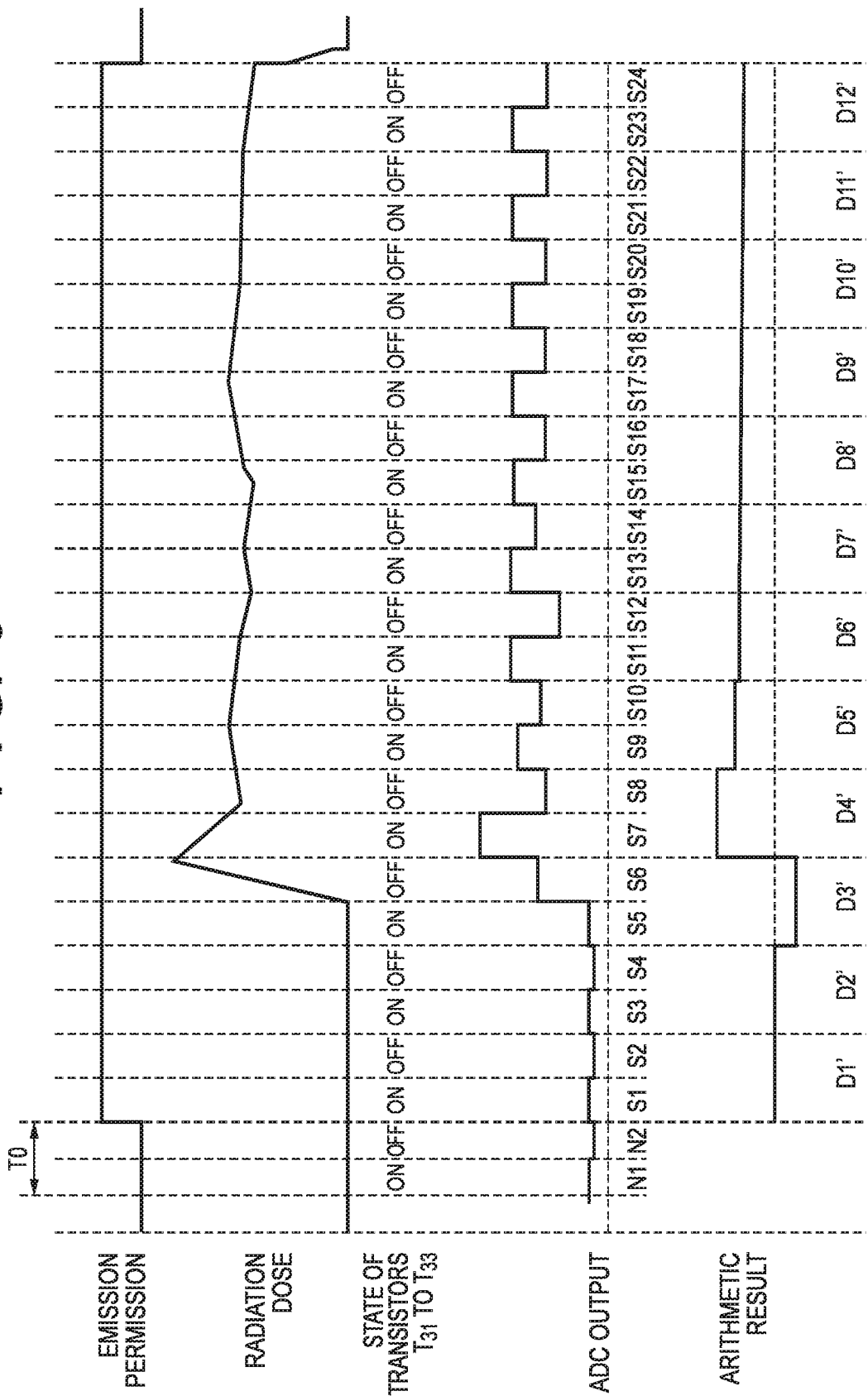

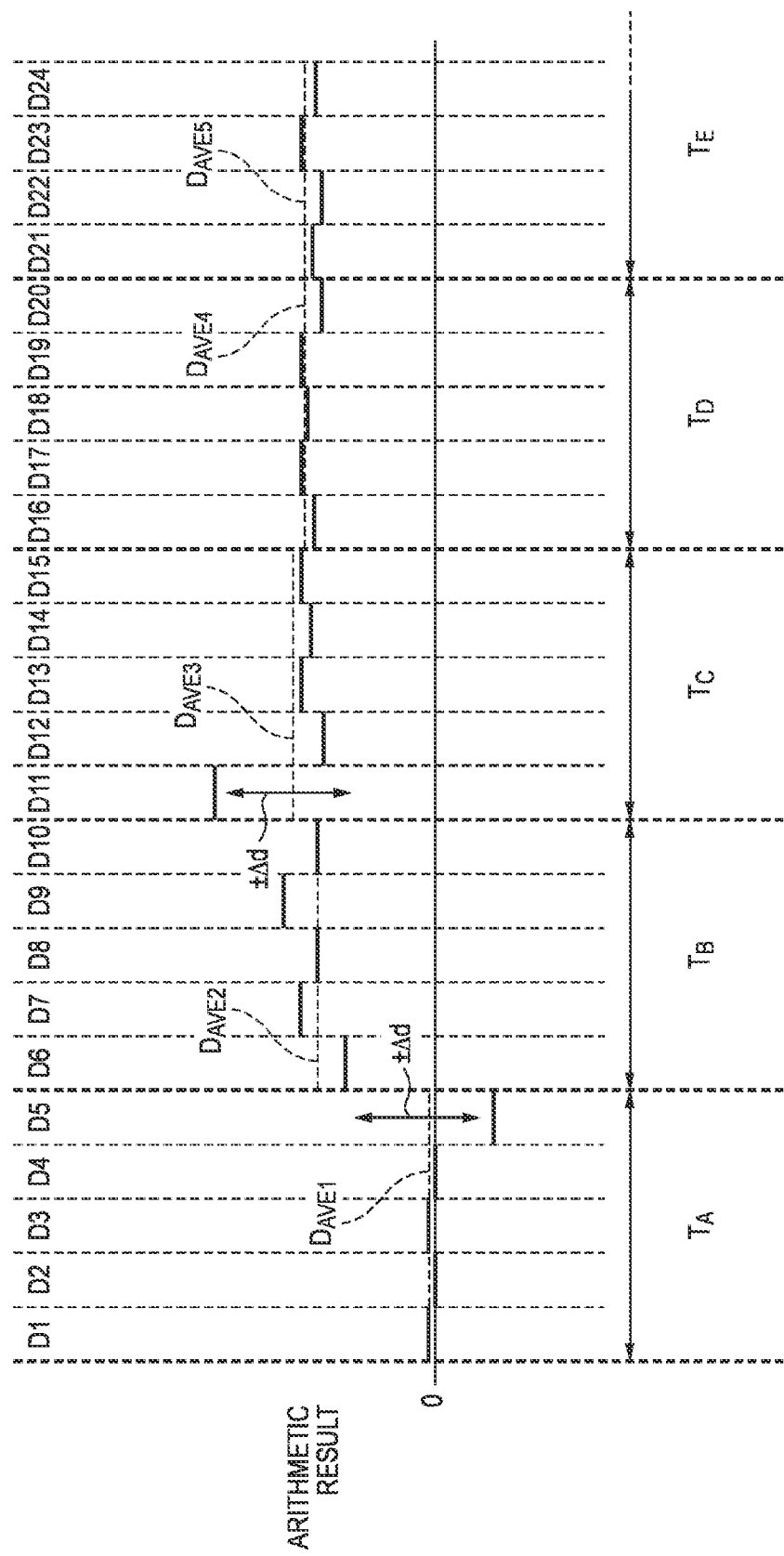

RADIATION IMAGE CAPTURING APPARATUS AND METHOD OF DRIVING THE SAME

BACKGROUND OF THE INVENTION

1. Field of the Invention

The present invention relates to a radiation image capturing apparatus and a method of driving the same.

2. Description of the Related Art

Japanese Patent Laid-Open No. 2013-135390 has disclosed a radiation image capturing apparatus including a plurality of sensors configured to detect radiation and a readout unit configured to read out signals from the plurality of sensors. The plurality of sensors of the radiation image capturing apparatus include, in addition to an imaging sensor configured to perform radiation imaging, a monitor sensor configured to monitor an irradiating dose of radiation from a radiation source.

According to Japanese Patent Laid-Open No. 2013-135390, the signals are regularly read out from the monitor sensor during radiation irradiation and Auto Exposure Control (to be simply referred to as "AEC" hereinafter) of, for example, controlling the radiation source based on the signals is performed.

A control signal for reading out the signals from the sensors is supplied to the readout unit. For example, when reading out the signals from the monitor sensor, crosstalk may occur between a signal line which transmits the control signal and a signal line which transmits the signals from the monitor sensor, and a signal level from the monitor sensor may vary. The signal level from the monitor sensor may also vary by, for example, substrate noise caused by operating the readout unit. This may cause a decrease in AEC accuracy.

SUMMARY OF THE INVENTION

The present invention provides a technique advantageous in increasing AEC accuracy.

One of the aspects of the present invention provides a radiation image capturing apparatus, comprising a sensor configured to monitor an irradiating dose of radiation from a radiation source, a switch configured to cause the sensor to output a sensor signal upon changing from a non-conductive state to a conductive state, a readout unit configured to read out the sensor signal from the sensor via the switch and a signal line, and a controlling unit configured to control the switch and the readout unit so as to perform first control of repeatedly performing, while radiation from the radiation source irradiates the sensor, a series of operations of a first operation of setting the switch to the conductive state and a second operation of setting the switch to the non-conductive state, second control of reading out, by the readout unit, the sensor signal from the sensor in the first operation as a first signal and reading out, by the readout unit, a potential of the signal line in the second operation as a second signal, and third control of calculating the irradiating dose of radiation based on the first signal and the second signal.

Further features of the present invention will become apparent from the following description of exemplary embodiments with reference to the attached drawings.

BRIEF DESCRIPTION OF THE DRAWINGS

FIGS. 5A and 5B are tables for explaining an example of a parameter for AEC:

FIG. 6 is a timing chart for explaining an example of AEC; and

FIG. 7 is a timing chart for explaining an example of AEC.

DESCRIPTION OF THE EMBODIMENTS

1. First Embodiment

The first embodiment will be described with reference to FIGS. 1 to 5B.

1-1. System Arrangement Example of Radiation Image Capturing Apparatus

Figure 1:
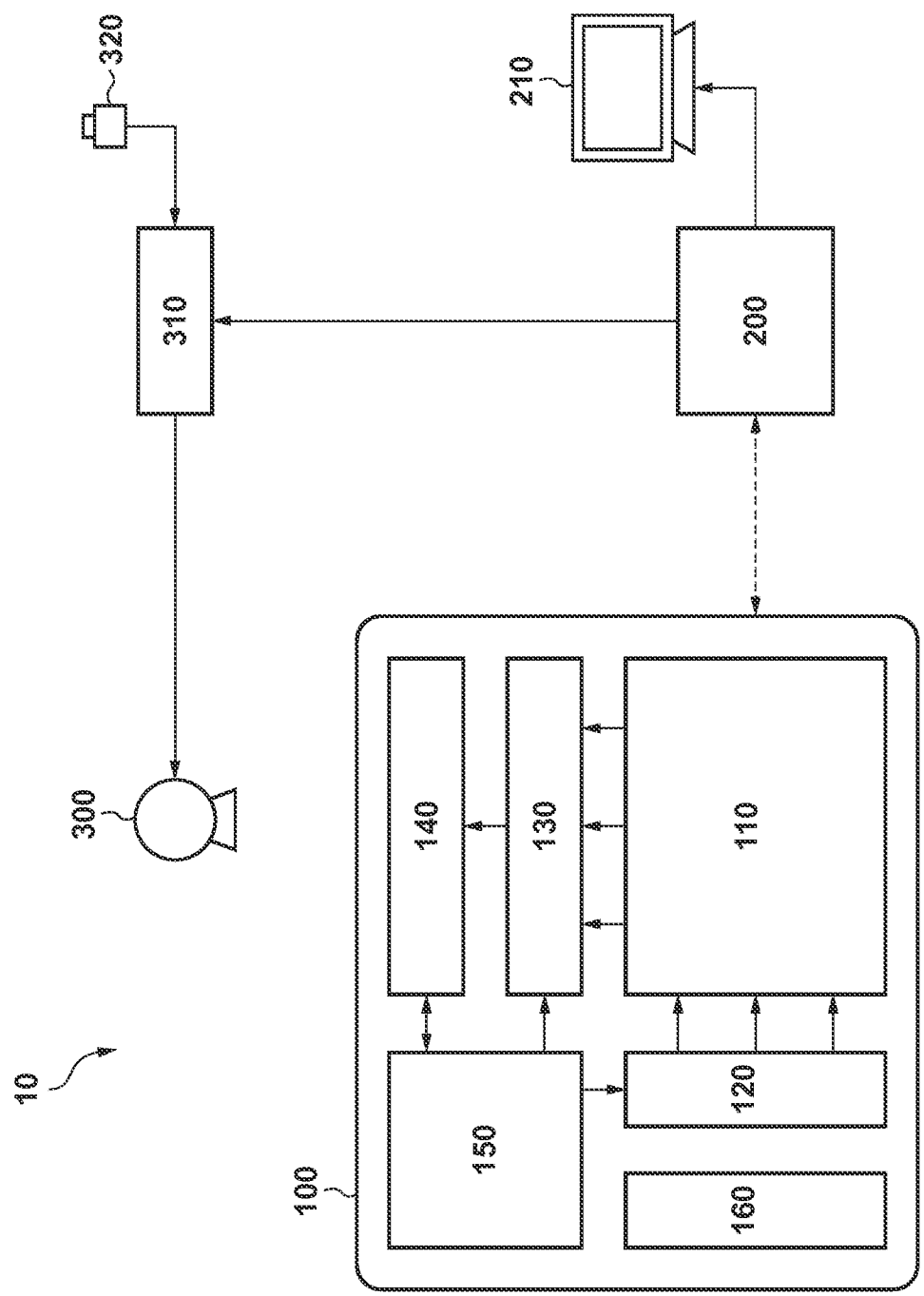
FIG. 1 is a block diagram for explaining an example of the system arrangement of a radiation image capturing apparatus.

FIG. 1 is a block diagram for explaining an example of the system arrangement of a radiation image capturing apparatus 10 (may be referred to as a radiation inspection apparatus and to be simply referred to as an "apparatus 10" hereinafter). The apparatus 10 includes, for example, an image capturing unit 100, a computer 200, a displaying unit 210, a radiation source 300, a radiation controlling unit 310, and an emission switch 320.

The image capturing unit 100 includes, for example, a sensor array 110, a driving unit 120, a readout unit 130, a processing unit 140, a controlling unit 150, and a power supplying unit 160.

The sensor array 110 includes a plurality of sensors arrayed so as to form a plurality of rows and a plurality of columns. The sensors include photoelectric conversion elements such as PIN sensors, MIS sensors, and the like formed on a glass substrate by using amorphous silicon. A scintillator which converts radiation into light can be arranged on the sensor array 110. A so-called indirect conversion type arrangement in which radiation to each sensor is converted into light by the scintillator and the light is converted into an electrical signal by the photoelectric conversion element will be exemplified here. However, a so-called direct conversion type arrangement in which radiation is (directly) converted into an electrical signal may be adopted.

The driving unit 120 drives, for example, each sensor of the sensor array 110 based on a control signal from the controlling unit 150. The readout unit 130 reads out, based on the control signal from the controlling unit 150, a sensor signal (sometimes to be simply referred to as a "signal" hereinafter in this specification) from each sensor. The sensor signal corresponds to the dose of radiation that has entered each sensor and corresponds to, in this arrangement, the amount of charges accumulated in each sensor by photoelectric conversion. The processing unit 140 forms the image data of a radiation image based on the sensor signal read out from each sensor. The controlling unit 150 controls the driving unit 120 and the readout unit 130 by using the control signal. A dedicated circuit such as ASIC (Application Specific Integrated Circuit) may be used as the controlling unit 150. Alternatively, its function may be realized by a program or software using computer and the like. The power supplying unit 160 generates a plurality of voltages based on an externally received power supply voltage and supplies, to each corresponding unit, the voltage for operating it properly.

The image capturing unit 100 and the computer 200 are connected to each other by a communication unit (not shown). The communication unit causes, for example, the image capturing unit 100 to receive a control signal corresponding to information required for imaging from the computer 200. Image data formed by the processing unit 140 of the image capturing unit 100 is output to the computer 200 via the communication unit. The communication unit may be a wired communication unit such as a LAN cable or a wireless communication unit such as a wireless LAN.

The computer 200 controls the operation of the entire apparatus 10 by performing synchronous control of the respective units. A user can, for example, input a part to be an imaging target, an imaging condition, and other information required for imaging to the computer 200 by using a predetermined terminal. Based on the input information, the computer 200 exchanges control signals for performing radiation imaging with the image capturing unit 100 and causes, upon receiving image data obtained by the image capturing unit 100 in the radiation imaging, the displaying unit 210 to display the image data. The computer 200 can also inform the user of the state of the image capturing unit 100 by causing the displaying unit 210 to display the state.

The computer 200 outputs, in accordance with the state of the image capturing unit 100, a control signal for restricting the start of radiation imaging to the radiation controlling unit 310. In response to pressing the emission switch 320 by the user in a state in which radiation imaging can be started, the radiation controlling unit 310 drives the radiation source 300 and starts irradiating the image capturing unit 100 with radiation.

Note that the arrangement of the apparatus 10 is not limited to this example, but a part of it may be changed in accordance with a purpose, application, or the like. For example, some of the respective units may belong to other units or each unit may have an additional function different from the function that has been described in this example.

1-2. Arrangement Example of Image Capturing Unit

Figure 2:
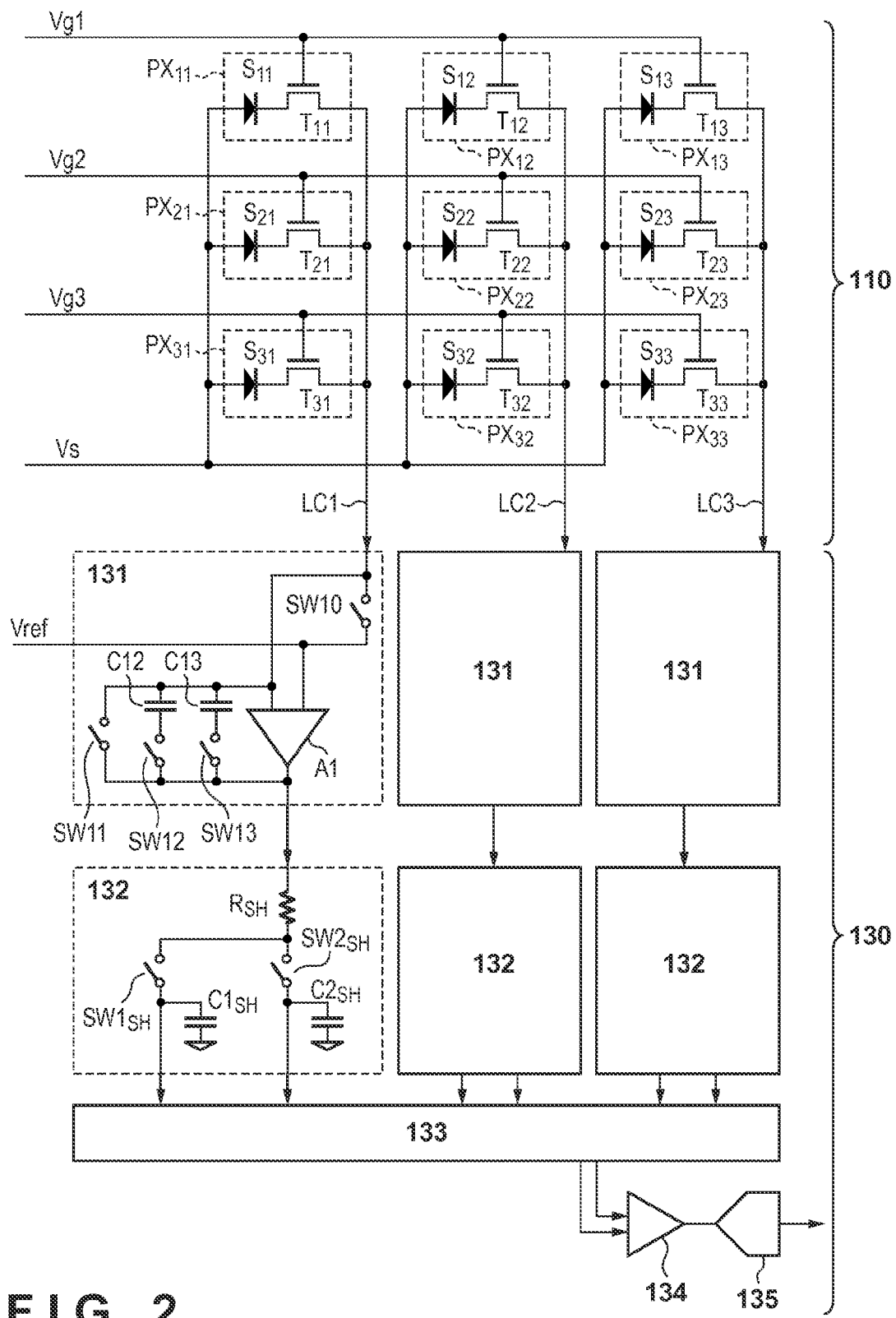
FIG. 2 is a diagram for explaining an example of the arrangement of an image capturing unit.

FIG. 2 is a diagram for explaining an example of the arrangement of portions of the sensor array 110 and the readout unit 130 out of the image capturing unit 100. The sensor array 110 includes, for example, pixels PX, that is, $PX_{11}$ to $PX_{33}$ arrayed in three (rows)×three (columns). The respective pixels PX include sensors S, that is, $S_{11}$ to $S_{33}$ and thin film transistors T, that is, $T_{11}$ to $T_{33}$ each serving as a switch connected to one terminal of each sensor S. The arrangement of three (rows)×three (columns) is exemplified for the sake of simplicity. However, the numbers of rows and columns are not limited to this example.

The gate of each transistor T is connected to, for example, a corresponding signal line out of signal lines Vg, that is, Vg1 to Vg3 arranged for the respective rows. Control signals are supplied to the gates via the signal lines Vg. For example, each transistor T changes to a conductive state when the control signal is at high level (H) and each transistor T changes to a non-conductive state when the control signal is at low level (L). By changing the transistors T to the conductive state, sensor signals of the sensors S are read out, by the readout unit 130, via column signal lines LC, that is, LC1 to LC3 arranged for the respective columns of the sensor array 110. Note that a ground bias line Vs is connected to the other terminal of each sensor S.

The readout unit 130 includes column amplifiers 131, sampling units 132, a multiplexer 133, a differential amplifier 134, and an analog-to-digital conversion unit 135 (to be referred to as an "A/D conversion unit 135" hereinafter).

The column amplifier 131 is arranged for each column of the sensor array 110 and includes, for example, an amplifier A1, switches SW10 to SW13, and feedback capacitors C12 and C13. One input terminal of each amplifier A1 is electrically connected to a reference potential Vref and connected to the column signal line LC via the switch SW10. The other input terminal of each amplifier A1 is connected to the column signal line LC. The potential of each column signal line LC is reset (becomes Vref) by setting the switch SW10 to the conductive state. The sensor signal is input to the other input terminal when the switch SW10 is in the non-conductive state.

For example, a feedback path including the switches SW11 to SW13 and the capacitors C12 and C13 is formed between the other input terminal and the output terminal of each amplifier A1. More specifically, the switch SW11 forms the first feedback path. The switch SW12 and the capacitor C12 are connected to each other in series and form the second feedback path. The switch SW13 and the capacitor C13 are connected to each other in series and form the third feedback path. The first to the third feedback paths are arranged in parallel to each other.

Each column amplifier 131 amplifies the sensor signal from each sensor S by setting the switch SW11 to the non-conductive state and setting at least one of the switches SW12 and SW13 to the conductive state. The signal amplification ratio of each column amplifier 131 changes when the switch SW12 is set to the conductive state, the switch SW13 is set to the conductive state, and when both the switches SW12 and SW13 are set to the conductive state, and can be changed in accordance with, for example, the imaging condition. Each column amplifiers 131 is initialized by setting the switch SW11 to the conductive state.

Each sampling unit 132 corresponds to the column amplifier 131 and samples a signal from the corresponding column amplifier 131. Each sampling unit 132 includes, for example, a resistive element $R_{SH}$, sampling switches $SW1_{SH}$ and $SW2_{SH}$, and sampling capacitors $C1_{SH}$ and $C2_{SH}$. For example, the output value of each column amplifier 131 when initializing the column amplifier 131 (when setting the switch SW11 to the conductive state) is sampled by setting the switch $SW1_{SH}$ to the conductive state and held in the capacitor $C1_{SH}$. On the other hand, the sensor signal amplified by each column amplifier 131 is sampled by setting the switch $SW2_{SH}$ to the conductive state and held in the capacitor $C2_{SH}$.

The resistive element $R_{SH}$ forms a low-pass filter together with the capacitor $C1_{SH}$ or $C2_{SH}$ when the switch $SW1_{SH}$ or $SW2_{SH}$ changes to the conductive state. This makes it possible to remove high-frequency noise such as spike noise. The resistive element $R_{SH}$ may be a variable resistor and may be changed in accordance with, for example, the imaging condition.

The multiplexer 133 selects any one of the sampling units 132 arranged for the respective columns, and outputs, to the differential amplifier 134, signals held in the capacitors $C1_{SH}$ and $C2_{SH}$ of the selected sampling unit 132. The differential amplifier 134 amplifies the difference between the signal held in the capacitor $C1_{SH}$ of the selected sampling unit 132 and the signal held in the capacitor $C2_{SH}$ of the selected sampling unit 132. The offset component of each column amplifier 131 is substantially removed by obtaining the difference between the signal held in the capacitor $C1_{SH}$ and the signal held in the capacitor $C2_{SH}$.

Then, the signals from the differential amplifier 134 are analog-to-digital converted (A/D converted) by the A/D conversion unit 135. The processing unit 140 can perform predetermined arithmetic processing and signal processing on the A/D converted signals. For example, in addition to forming the image data of the radiation image based on the A/D converted signals, the processing unit 140 performs arithmetic processing for performing AEC, the detail of which will be described later.

Figure 3:
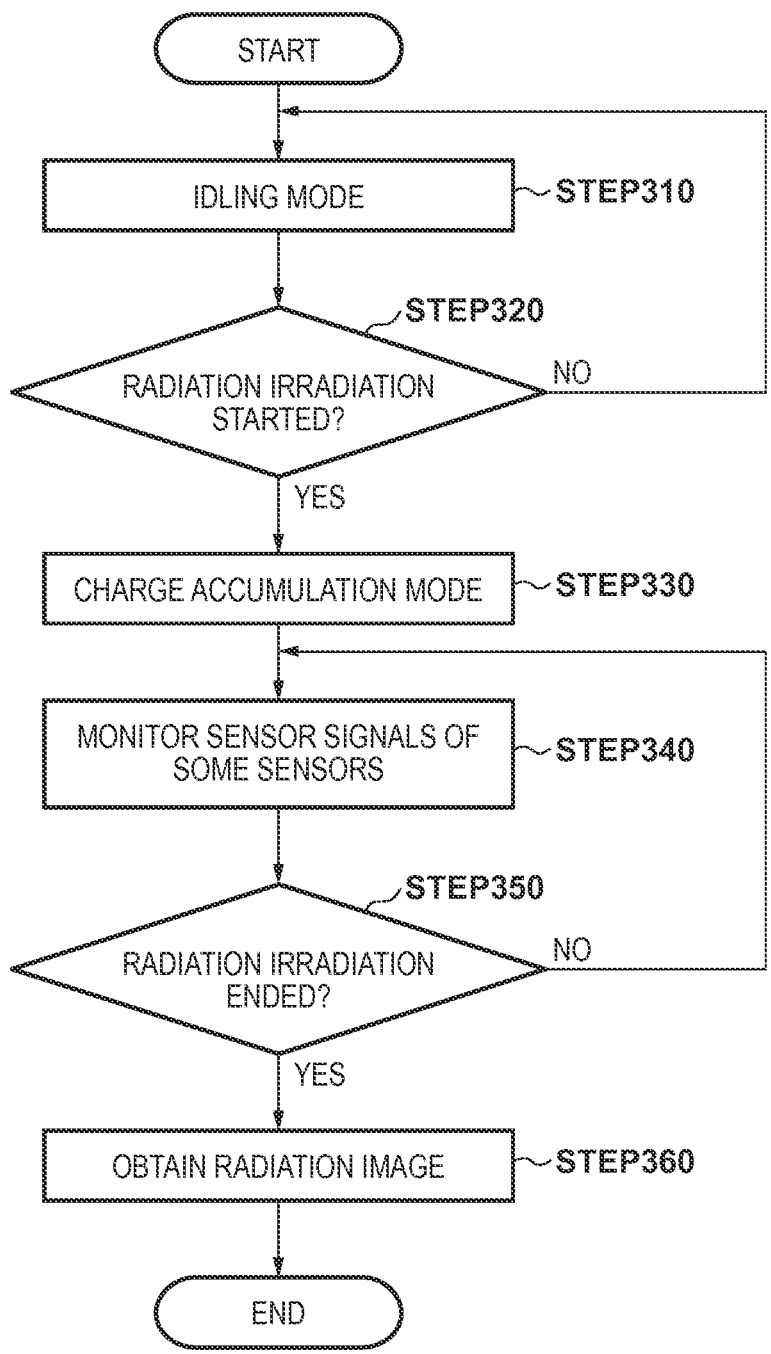
FIG. 3 is a flowchart for explaining an example of a method of driving the image capturing unit and AEC.

1-3. Example of Method of Driving Radiation Image Capturing Apparatus and AEC FIG. 3 is a flowchart for explaining an example of a method of driving the apparatus 10. In STEP310, the apparatus 10 is in an idling mode and waits while performing a predetermined initialization operation in preparation for the start of radiation imaging. Note that in this period, each unit not in use may be maintained in a low power consumption mode or a pause mode in which, for example, power supply is suppressed.

In STEP320, determination of whether to start radiation irradiation is made. The determination can be made based on, for example, whether the user has pressed the emission switch 320. If radiation irradiation is started, the process advances to STEP330. If the irradiation is not started, the process returns to STEP310.

In STEP330, radiation irradiation is started and charge accumulation is performed in each sensor S of the sensor array 110. The charges corresponding to the dose of irradiated radiation are accumulated in each sensor S.

In STEP340, signals are read out from some sensors S and sensor signals of the some sensors S are monitored.

In STEP350, it is determined, based on a result of monitoring in STEP340, whether radiation irradiation is ended. More specifically, the dose of radiation (prediction value) which irradiates each sensor S is calculated based on the result of monitoring and it is determined, based on the calculation result, whether radiation irradiation is ended. If radiation irradiation is ended, the process advances to STEP360. If the irradiation is not ended, the process returns to STEP340.

In STEP360, radiation irradiation is ended, the signal is read out from each sensor S, and the image data of the radiation image is obtained based on the read out sensor signal.

A concrete example of the above-described flowchart will be described below with reference to FIG. 4.

Figure 4:
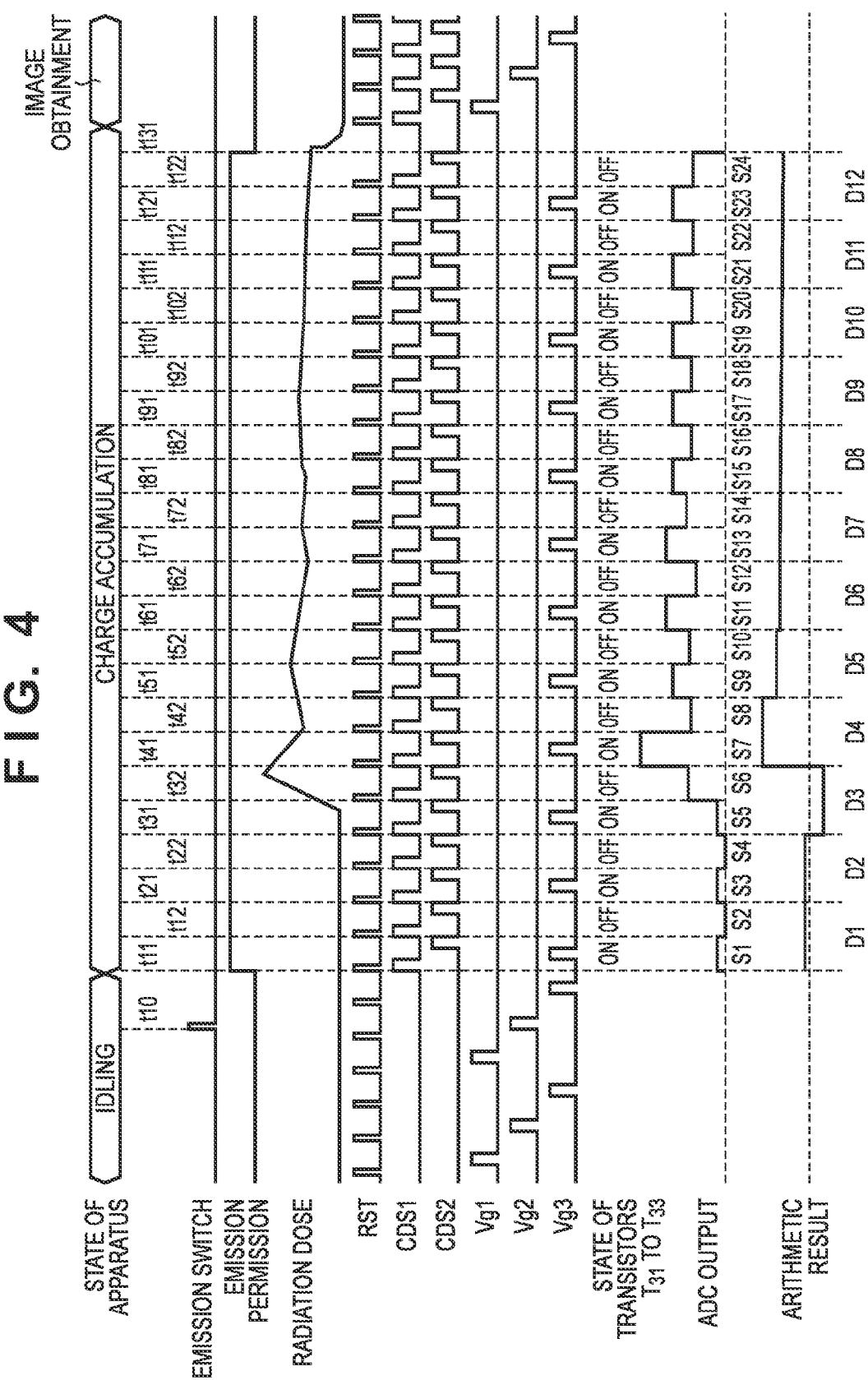
FIG. 4 is a timing chart for explaining the example of the method of driving the image capturing unit and AEC.

FIG. 4 is a timing chart for explaining an example of the method of driving the apparatus 10. The abscissa of FIG. 4 represents the time axis. The ordinate of FIG. 4 represents the state of the apparatus 10, the state of the emission switch 320, emission permission/nonpermission, radiation dose (irradiating dose of radiation), various types of control signals, the state of the transistors $T_{31}$ to $T_{33}$ on the third row, the output of the A/D conversion unit 135, and a result of arithmetic processing by the processing unit 140.

A control signal RST is a reset signal for initializing each column amplifier 131, and supplied to the switches SW10 and SW11. A control signal CDS1 is a control signal for sampling the output value of each column amplifier 131 when initializing the column amplifier 131, and supplied to the switch $SW1_{SH}$. A control signal CDS2 is a control signal for sampling the sensor signal amplified by each column amplifier 131, and supplied to the switch $SW1_{SH}$. Each of the signals Vg1 to Vg3 indicates a signal level at which each of the signal lines Vg1 to Vg3 is transmitted, that is, the potential of each of the signal lines Vg1 to Vg3, and is supplied to the gate of each transistor T on the corresponding row.

In a period before starting radiation irradiation when the apparatus 10 is in the idling mode, the signals Vg1 to Vg3 are sequentially set to H while setting the control signal RST to H periodically. By doing so, each sensor of the sensor array 110 is initialized for each row while initializing each column amplifiers 131 and the potential of each column signal line LC, and the apparatus 10 waits in preparation for the start of radiation imaging. Note that in this period, each unit not in use may be maintained in the low power consumption mode or the pause mode in which, for example, power supply is suppressed.

In response to pressing the emission switch 320 under the idling mode (at time t10 of FIG. 4), the aforementioned initialization operation in the image capturing unit 100 is ended, and the computer 200 notifies the radiation controlling unit 310 of emission permission by setting an emission permission signal to H. Then, radiation irradiation is started by the radiation source 300, the apparatus 10 changes to a charge accumulation mode, and the charges corresponding to the dose of irradiated radiation are accumulated in each sensor S of the sensor array 110. At this time, the computer 200 may control the image capturing unit 100 by a predetermined control signal in response to pressing the emission switch 320. However, the image capturing unit 100 itself may detect the start of radiation irradiation by a predetermined detecting unit.

At times t11 to t131 in the charge accumulation mode, the signal CDS1 is set to H together with each pulse of the signal RST while setting the signal RST to H periodically, and then the signal CDS2 is set to H. In this example, the signal Vg3 is set to H in the respective periods between the pulse of the signal CDS1 and the pulse of the signal CDS2 at times t11 and t12, t21 and t22, . . . , t121 and t122. On the other hand, the signal Vg3 is maintained at L in the respective periods of times t12 and t21, t22 and t31, . . . , t122 and t131.

For example, at times t11 and t12, first, the signals RST and CDS1 are set to H, and the output value of each column amplifier 131 when initializing the column amplifier 131 is sampled. Next, the signal Vg3 is set to H and the transistors $T_{31}$ to $T_{33}$ on the third row are set to the conductive state. Then, the signal CDS2 is set to H and the sensor signal amplified by each column amplifier 131 is sampled. An output S1 indicates the output value (for the sake of simplicity, assume that it is the average value on the first to the third columns) of the A/D conversion unit 135 which has received the above-described sampling result.

Next, at times t12 and t21, first, the signals RST and CDS1 are set to H, and the output value of each column amplifier 131 when initializing the column amplifier 131 is sampled. Then, the signal CDS2 is set to H and the sensor signal amplified by each column amplifier 131 is sampled while maintaining the signal Vg3 at L (maintaining the transistors $T_{31}$ to $T_{33}$ in the non-conductive state). An output S2 indicates the output value (for the sake of simplicity, assume that it is the average value on the first to the third columns) of the A/D conversion unit 135 which has received the above-described sampling result. An arithmetic result D1 is obtained from arithmetic processing by the processing unit 140, and indicates a signal level based on the difference between the output S1 and the output S2.

A series of the above-described operations at times t11 to t21 is performed repeatedly in the same manner at times t21 to t131. Outputs S3, S5, ..., S23 indicate the output values of the A/D conversion unit 135 corresponding to the sampling result when performing the above-described sampling while setting the transistors $T_{31}$ to $T_{33}$ to the conductive state. On the other hand, outputs S4, S6, ..., S24 indicate the output values of the A/D conversion unit 135 corresponding to the sampling result when performing the above-described sampling while maintaining the transistors $T_{31}$ to $T_{33}$ in the non-conductive state. Each of arithmetic results D2, D3, ..., D12 is obtained from arithmetic processing by the processing unit 140, and indicates a signal level based on the difference between the outputs S3, S5, ..., S23 and the outputs S4, S6, ..., S24.

That is, when setting an integer of k=1 to n (here, n=12), $Dk=S(2k-1)-S(2k)$ is given.

The controlling unit 150 receives arithmetic results Dk from the processing unit 140 and performs AEC (Auto Exposure Control) based on the arithmetic results Dk. Specifically, for example, the controlling unit 150 calculates, based on the arithmetic results Dk, the dose of radiation which irradiates each sensor S and controls the radiation source 300 based on the calculation result. More specifically, the controlling unit 150 notifies the computer 200 of the radiation dose and any other state by a predetermined control signal, and the radiation controlling unit 310 controls the radiation source 300 based on the control signal from the computer 200. For example, the controlling unit 150 can control at least one of the irradiation dose, the irradiation intensity, and the irradiation time of radiation, and sets the emission permission signal to L to terminate radiation irradiation when the radiation dose satisfies a predetermined condition. In this example, the emission permission signal is set to L at time t131 to terminate radiation irradiation.

The arrangement in which the controlling unit 150 controls the radiation source 300 indirectly by using the computer 200 and the radiation controlling unit 310 is exemplified. However, an arrangement in which the controlling unit 150 controls the radiation source 300 directly may be adopted.

Note that when reading out the signal from each sensor S, a signal level based on the above-described sampling result and another sensor signal may vary due to, for example, a parasitic capacitance between each column signal line LC and each signal line which supplies the control signal to the readout unit 130. The signal level may also vary due to, for example, substrate noise caused by operating the readout unit 130. During radiation irradiation, in each pixel PX where the transistor T is in the non-conductive state, the potential of the sensor S increases and the voltage is transmitted to the column signal line LC via the parasitic capacitance between the column signal line LC and the pixel. This may also vary the signal level. These variations are also referred to as crosstalk noise. Therefore, in this embodiment, the difference between the sampling result (outputs S1, S3, ..., S23) when the transistors $T_{31}$ to $T_{33}$ are in the conductive state and the sampling result (outputs S2, S4, ..., S24) when the transistors $T_{31}$ to $T_{33}$ are in the non-conductive state is obtained. As a result, crosstalk noise is canceled, that is, crosstalk noise is substantially removed from the sampling result (outputs S1, S3, ..., S23) when the transistors $T_{31}$ to $T_{33}$ are in the conductive state. This embodiment is advantageous in increasing AEC accuracy because AEC is performed based on the arithmetic results Dk from which crosstalk noise is removed substantially.

Then, the apparatus 10 changes to an image obtaining mode in which the sensor signal is read out from each sensor S of the sensor array 110 and the image data of the radiation image is obtained based on the read out sensor signal. According to this example, the signals are read out periodically at times t11 to t131 in the sensors $S_{31}$ to $S_{33}$ on the third row, and charge accumulation times in the sensors $S_{31}$ to $S_{33}$ are different from those in the sensors $S_{11}$ to $S_{13}$ on the first row and the sensors $S_{21}$ to $S_{23}$ on the second row. Therefore, the sensor signals from the sensors $S_{31}$ to $S_{33}$ on the third row can be corrected based on the ratio of these charge accumulation times.

1-4. Modification of AEC

In the aforementioned example of FIG. 4, after a predetermined delay since the emission permission signal has changed to H, the radiation dose increases before time t32 and between times t32 and t41, it is not stable and formed into a spike shape in a period shorter than a period required for a onetime signal readout operation. In this case, since the arithmetic result D3 has a negative value, AEC may be performed based on the arithmetic results after D4. For example, if the total sum of the arithmetic results D4 to D12 becomes larger than a predetermined value, radiation irradiation can be ended.

Note that a delay time of radiation irradiation and the spike-shaped radiation dose immediately after the start of radiation irradiation described above result from, for example, a time required to generate a high voltage required for radiation irradiation, a potential variation of a power supply voltage supplied to the apparatus 10, and the characteristic of a tube for generating radiation. Therefore, the arithmetic result D1 or the like from the time when the emission permission signal has changed to H at time t11 until a predetermined time has elapsed may not be used for AEC.

This can be performed by, for example, evaluating the apparatus 10, storing a reference table for specifying the above-described predetermined time or a parameter corresponding to the above-described predetermined time in a predetermined memory (not shown) in the advance, and then referring to the reference table when performing radiation imaging.

A parameter T is set as, for example, a period from time t11 at which the emission permission signal changes to H (that is, time at which the apparatus 10 changes from the idling mode to the charge accumulation mode). The parameter T may be set, for example, based on the imaging condition input by the user before starting radiation imaging while referring to the above-described reference table. However, the parameter T may be set directly by the user or may be a fixed value.

FIG. 5A shows, for each condition, a reference table which defines the parameter T obtained by the evaluation of the apparatus 10. The parameter T for each condition is set as, for example, a period from time t11 until the output value of the A/D conversion unit 135 becomes larger than the predetermined value. For example, the maximum value $T_{MAX}$ out of the obtained parameters T described above may usually be used as the fixed-value parameter T. Using the maximum-value parameter $T_{MAX}$ makes it possible to perform AEC only by using the appropriate arithmetic result out of some arithmetic results Dk.

FIG. 5B shows, for each condition, a reference table which defines the parameter T obtained by radiation imaging that has performed under some imaging conditions. The tube for generating radiation and the other respective units which constitute the apparatus 10 may deteriorate each time radiation imaging is performed. Therefore, the above-described reference table may be updated based on the output S1 or the like obtained by each radiation imaging.

The mode in which AEC is performed by using the arithmetic results Dk from the time when the emission permission signal has changed to H at time t11 until a time based on the parameter T has elapsed is exemplified here. However, the processing unit 140 may be controlled to start the arithmetic operation after the time has elapsed.

The reference table is stored in a predetermined database for each IP address. The parameter T corresponding to the imaging condition may be set as needed by referring to the reference table corresponding to the IP address of the apparatus 10.

1-5. Others

In this embodiment, the mode in which AEC is performed based on the signals from the sensors $S_{31}$ to $S_{33}$ on the third row in the charge accumulation mode is exemplified. However, the example of AEC is not limited to this mode. That is, AEC can be performed based on the signals from at least some sensors S of the sensor array 110. The signals from the sensors $S_{11}$ to $S_{13}$ on the first row, the sensors $S_{21}$ to $S_{23}$ on the second row, and/or the sensors $S_{31}$ to $S_{33}$ on the third row may be used for AEC.

The arrangement in which AEC is performed based on the signal from each sensor S which forms the corresponding pixel PX is exemplified in this embodiment. However, an arrangement in which the sensor array 110 further includes a sensor different from the sensor S which forms each pixel PX and designed specifically for monitoring the radiation dose may be adopted.

2. Second Embodiment

The second embodiment will be described with reference to FIG. 6. The main difference between this embodiment and the aforementioned first embodiment is that an offset component caused by a difference in the state of transistors $T_{31}$ to $T_{33}$ is further removed from arithmetic results Dk. More specifically, an output value of an A/D conversion unit 135 when the transistors $T_{31}$ to $T_{33}$ are in a conductive state and an output value of the A/D conversion unit 135 when the transistors $T_{31}$ to $T_{33}$ are in a non-conductive state are obtained before setting an emission permission signal to H (before an apparatus 10 changes to a charge accumulation mode). Then, the offset component caused by the difference in the state of the transistors $T_{31}$ to $T_{33}$ is calculated based on these output values.

FIG. 6 shows, as in FIG. 4, a part of a timing chart (more specifically, emission permission/nonpermission, radiation dose, the state of the transistors $T_{31}$ to $T_{33}$, the output of the A/D conversion unit 135, and a result of arithmetic processing by a processing unit 140) according to this embodiment. As shown in FIG. 6, in a period T0 before setting the emission permission signal to H (before the apparatus 10 changes to the charge accumulation mode), outputs N1 and N2 of the A/D conversion unit 135 when the transistors $T_{31}$ to $T_{33}$ are in the conductive state and the non-conductive state are obtained. Then, arithmetic results Dk' obtained by subtracting the offset component serving as the difference between the output N1 and the output N2 from the aforementioned arithmetic results Dk are obtained.

That is, the arithmetic results Dk' are given by using an integer of k=1 to n (here, n=12):

$$Dk'=Dk-(N1-N2)=\{S(2k-1)-S(2k)\}-(N1-N2)$$

AEC is performed based on the arithmetic results Dk'.

This embodiment is advantageous in further increasing AEC accuracy because the offset component caused by the difference in the state of the transistors $T_{31}$ to $T_{33}$ is further removed from the aforementioned arithmetic results Dk from which crosstalk noise is removed substantially. The mode in which the outputs N1 and N2 are obtained one by one is exemplified here. However, the present invention is not limited to this mode, but the average value of the offset component (N1-N2) may be obtained by obtaining the outputs N1 and N2 twice or more.

3. Third Embodiment

The third embodiment will be described with reference to FIG. 7. The main difference between this embodiment and the aforementioned first embodiment is that AEC is performed by using the average value of arithmetic results Dk for each predetermined section. According to this embodiment, AEC accuracy can be increased even if some arithmetic results Dk become singular values by sudden high-frequency noise.

If, for example, the difference between a given arithmetic result Dk and an average value $D_{AVE}$ in a section corresponding to it is larger than a predetermined reference, the arithmetic result Dk may be replaced by the average value $D_{AVE}$. More specifically, as illustrated in FIG. 7, an average value $D_{AVE}$ of five arithmetic results is calculated and if, for example, the difference between an average value $D_{AVE1}$ of arithmetic results D1 to D5 and the arithmetic result D5 is larger than a reference $\pm\Delta d$, AEC is performed by using the average value $D_{AVE1}$ instead of the arithmetic result D5. Furthermore, if, for example, the difference between an average value $D_{AVE3}$ of arithmetic results D11 to D15 and the arithmetic result D11 is larger than the reference $\pm\Delta d$, AEC is performed by using the average value $D_{AVE3}$ instead of the arithmetic result D11.

In this example, the mode in which if the difference between the given arithmetic result Dk and the average value $D_{AVE}$ in the section corresponding to it is larger than the predetermined reference, AEC is performed by using the average value $D_{AVE}$ instead of the arithmetic result Dk is exemplified. However, the present invention is not limited to this mode. For example, if the difference between adjacent arithmetic results Dk is larger than a predetermined reference, AEC may be performed by using the average values $D_{AVE}$. Further, in this example, the mode in which the arithmetic result Dk is replaced by the average values $D_{AVE}$ is exemplified. However, AEC can be performed without using the arithmetic result Dk and another processing may be performed on the arithmetic result Dk. AEC may be performed by, for example, using, instead of the arithmetic result Dk, the average value of arithmetic results D(k-1) and D(k+1) before and after the arithmetic result Dk. Alternatively, AEC may be performed based on a predetermined statistical result of the arithmetic result Dk.

4. Others

The several preferred embodiments have been exemplified above. However, the present invention is not limited to these embodiments. The present invention may change some of the respective modes or combine the respective characteristics of the respective embodiments in accordance with an application or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-148161, filed Jul. 18, 2014, which is hereby incorporated by reference herein in its entirety.

What is claimed is:

1. A radiation image capturing apparatus, comprising:
    a sensor configured to monitor an irradiating dose of radiation from a radiation source;
    a switch configured to cause said sensor to output a sensor signal upon changing from a non-conductive state to a conductive state;
    a readout unit configured to read out the sensor signal from said sensor via said switch and a signal line; and
    a controlling unit configured to control the switch and the readout unit so as to perform first control of repeatedly performing, while radiation from the radiation source irradiates said sensor, a series of operations including a first operation of setting said switch to the conductive state and a second operation of setting said switch to the non-conductive state,
    second control of reading out, by said readout unit, the sensor signal from said sensor in the first operation as a first signal and reading out, by said readout unit, a potential of the signal line in the second operation as a second signal, and
    third control of calculating the irradiating dose of radiation based on the first signal and the second signal.

2. The apparatus according to claim 1, wherein in the third control, said controlling unit outputs a control signal for controlling the radiation source and at least one of the irradiation dose, an irradiation intensity, and an irradiation time of radiation.

3. The apparatus according to claim 1, wherein for each of the series of the operations performed repeatedly, said controlling unit calculates a difference between the first signal obtained in the first operation and the second signal obtained in the second operation, and performs the third control based on the difference if the difference satisfies a predetermined condition.

4. The apparatus according to claim 1, wherein said controlling unit calculates an average value of a difference between the first signal obtained by the first operation and the second signal obtained by the second operation for the series of operations performed not less than twice, and performs the third control based on the average value.

5. The apparatus according to claim 1, wherein for each of the series of the operations performed repeatedly, said controlling unit performs the third control based on a difference between the first signal obtained by the first operation and the second signal obtained by the second operation and if the difference does not satisfy a predetermined condition, said controlling unit performs the third control based on an average value of differences between the first signals obtained by the first operations and the second signals obtained by the second operations for the series of operations performed not less than twice.

6. The apparatus according to claim 1, wherein said controlling unit performs fourth control of setting each switch to the conductive state and initializing each sensor before radiation irradiation starts, and
    said controlling unit
    performs the first control, the second control, and the third control after a predetermined time elapses since the fourth control has ended, or
    performs the first control and the second control since the fourth control has ended and performs, after the predetermined time has elapsed since the fourth control had ended, the third control on the first control and the second control that have been performed after the predetermined time had elapsed.

7. The apparatus according to claim 6, further comprising a detecting unit configured to detect that the radiation source has started radiation irradiation,
    wherein said controlling unit terminates the fourth control based on detection by said detecting unit.

8. The apparatus according to claim 6, further comprising a memory configured to hold a reference table for specifying the predetermined time,
    wherein said controlling unit sets, while referring to the reference table, the predetermined time based on an imaging condition set by a user.

9. The apparatus according to claim 1, further comprising a plurality of pixels configured to obtain image data corresponding to radiation,
    wherein at least one of the plurality of pixels includes said sensor and said switch.

10. A method of driving a radiation image capturing apparatus,
    the radiation image capturing apparatus including
    a sensor configured to monitor an irradiating dose of radiation from a radiation source,
    a switch configured to cause the sensor to output a sensor signal upon changing from a non-conductive state to a conductive state, and
    a readout unit configured to read out the sensor signal from the sensor via the switch and a signal line, the method comprising steps of:
repeatedly performing, while radiation from the radiation source irradiates the sensor, a series of operations including a first operation of setting the switch to the conductive state and a second operation of setting the switch to the non-conductive state;
reading out, by the readout unit, the sensor signal from the sensor in the first operation as a first signal and reading out, by the readout unit, a potential of the signal line in the second operation as a second signal; and
calculating the irradiating dose of radiation based on the first signal and the second signal.

11. A radiation image capturing apparatus, comprising:
a sensor configured to monitor an irradiating dose of radiation from a radiation source;
a switch for outputting a signal from said sensor;
a controlling unit configured to control the switch so as to perform, while radiation from the radiation source irradiates said sensor, a first operation of switching said switch to a conductive state and a second operation of switching said switch to a non-conductive state; and
a calculation unit configured to calculate the irradiating dose of radiation based on a first signal obtained corresponding to the first operation and a second signal obtained corresponding to the second operation.

12. The apparatus according to claim 11, wherein said controlling unit outputs a control signal for controlling the radiation source and at least one of the irradiation dose, an irradiation intensity, and an irradiation time of radiation.

13. The apparatus according to claim 11, wherein
said controlling unit, while the radiation from the radiation source irradiates said sensor, repeatedly performs a series of operations including the first operation and the second operation, and
said calculation unit calculates, for each of the series of the operations performed repeatedly, the irradiating dose of radiation based on a difference between the first signal and the second signal.

14. The apparatus according to claim 11, wherein
said controlling unit, while the radiation from the radiation source irradiates said sensor, repeatedly performs a series of operations including the first operation and the second operation, and
said calculation unit calculates the irradiating dose of radiation based on an average value of a difference between the first signal and the second signal for the series of operations performed not less than twice.

15. The apparatus according to claim 11, wherein
said controlling unit, while the radiation from the radiation source irradiates said sensor, repeatedly performs a series of operations including the first operation and the second operation, and
said calculation unit calculates, for each of the series of the operations performed repeatedly, the irradiating dose of radiation based on a difference between the first signal and the second signal and if the difference does not satisfy a predetermined condition, said calculation unit calculates the irradiating dose of radiation based on an average value of differences between the first signal and the second signal for the series of operations performed not less than twice.

16. The apparatus according to claim 11, wherein
said controlling unit performs initializing each sensor, before radiation irradiation starts, by setting each switch to the conductive state, and
said controlling unit performs the first operation and the second operation after a predetermined time elapses since the initializing has ended.

17. The apparatus according to claim 16, further comprising a detecting unit configured to detect that the radiation source has started radiation irradiation,
wherein said controlling unit terminates the initializing based on detection by said detecting unit.

18. The apparatus according to claim 16, further comprising a memory configured to hold a reference table for specifying the predetermined time,
wherein said controlling unit sets, while referring to the reference table, the predetermined time based on an imaging condition set by a user.

19. The apparatus according to claim 11, further comprising a plurality of pixels configured to obtain image data corresponding to radiation,
wherein at least one of the plurality of pixels includes said sensor and said switch.

20. A method of driving a radiation image capturing apparatus, the radiation image capturing apparatus including a sensor configured to monitor an irradiating dose of radiation from a radiation source, and a switch for outputting a signal from the sensor, the method comprising steps of:
performing, while radiation from the radiation source irradiates the sensor, a first operation of switching the switch to a conductive state and a second operation of switching the switch to a non-conductive state; and
calculating the irradiating dose of radiation based on a first signal obtained corresponding to the first operation and a second signal obtained corresponding to the second operation.

* * * * *